US008210318B2

(12) United States Patent
Frowiss et al.

(10) Patent No.: US 8,210,318 B2
(45) Date of Patent: Jul. 3, 2012

(54) MINIMUM OIL MACHINING SYSTEM

(75) Inventors: Mathew Ryan Frowiss, Ventura, CA (US); Donald Paul Earl, Oxnard, CA (US); Symon Man-Yiu Tsui, Thousand Oaks, CA (US); Michael A. Teitel, Ventura, CA (US); William F. Tandrow, Simi Valley, CA (US)

(73) Assignee: Haas Automation, Inc., Oxnard, CA (US)

( * ) Notice: Subject to any disclaimer, the term of this patent is extended or adjusted under 35 U.S.C. 154(b) by 1707 days.

(21) Appl. No.: 11/398,420

(22) Filed: Apr. 4, 2006

(65) Prior Publication Data
US 2007/0289815 A1    Dec. 20, 2007

(51) Int. Cl.
*F01M 1/00* (2006.01)
*B67D 3/00* (2006.01)

(52) U.S. Cl. .......... 184/26; 222/522; 222/523; 222/527; 222/566; 222/567

(58) Field of Classification Search .......... 184/26; 222/522, 523, 527, 566, 567
See application file for complete search history.

(56) References Cited

U.S. PATENT DOCUMENTS

| | | | | | |
|---|---|---|---|---|---|
| 2,755,968 | A | * | 7/1956 | Fiant | 141/311 R |
| 3,258,208 | A | * | 6/1966 | Greenebaum, II | 239/397 |
| 3,602,273 | A | * | 8/1971 | Flentge et al. | 141/313 |
| 3,604,534 | A | * | 9/1971 | Whitaker | 184/6 |
| 3,764,072 | A | * | 10/1973 | Morehouse et al. | 239/722 |
| 4,266,693 | A | * | 5/1981 | Pfeiffer | 222/135 |
| 4,487,340 | A | * | 12/1984 | Shaffer | 222/385 |
| 4,597,697 | A | * | 7/1986 | Shaffer | 408/61 |
| 4,613,014 | A | * | 9/1986 | Millet | 184/1.5 |
| 4,648,486 | A | * | 3/1987 | Kayser et al. | 184/15.1 |
| 4,763,814 | A | * | 8/1988 | Haruyama et al. | 222/63 |
| 5,333,640 | A | * | 8/1994 | Swift et al. | 137/262 |
| 5,494,134 | A | * | 2/1996 | McConkey | 184/6.14 |
| 6,119,904 | A | * | 9/2000 | Ball | 222/372 |
| 6,230,843 | B1 | | 5/2001 | Geiss | |
| 6,378,472 | B1 | * | 4/2002 | Kantola | 123/73 AD |
| 6,387,026 | B1 | | 5/2002 | Schweizer et al. | |
| 6,405,810 | B1 | * | 6/2002 | Grach et al. | 175/52 |
| 6,521,349 | B1 | | 2/2003 | König et al. | |
| 6,557,651 | B1 | * | 5/2003 | Norby et al. | 175/52 |
| 6,592,051 | B1 | | 7/2003 | Natsu et al. | |
| 6,808,342 | B2 | | 10/2004 | Kress et al. | |
| 6,905,278 | B2 | | 6/2005 | Kress et al. | |
| 2004/0267340 | A1 | * | 12/2004 | Cioanta et al. | 607/105 |
| 2005/0061375 | A1 | * | 3/2005 | Baumann | 137/625.39 |

* cited by examiner

*Primary Examiner* — Bradley King
*Assistant Examiner* — Mahbubur Rashid
(74) *Attorney, Agent, or Firm* — McDermott Will & Emery LLP

(57) ABSTRACT

A lubrication system is provided for delivering coherent packets of a lubricant to a cutting surface of a machine tool. The system includes a nozzle for delivering a coherent packet of lubricant to the cutting surface, a pump for providing the lubricant to the nozzle via a supply line, and a controller configured to control the pump to provide the nozzle with a desired volume of lubricant. The coherent packet of lubricant has a volume substantially equal to the desired volume provided by the pump. The nozzle may be movable, and the controller may be configured to position and orient the movable nozzle. The controller may be an integrated controller configured to control both the operation of the lubrication system and the operation of the machine tool.

25 Claims, 6 Drawing Sheets

MINIMUM OIL MACHINING SYSTEM

FIELD OF THE INVENTION

The present invention generally relates to machine tools and, more particularly, relates to the lubrication of the cutting surfaces of a computer numeric control (CNC) machine tool.

BACKGROUND OF THE INVENTION

Computer numeric control (CNC) machine tools frequently utilize cutting heads such as, for example, taps, drills and boring bars, that require lubrication to prevent heat build-up and premature wear. To optimize the efficiency of an automated machine tool, it is desirable to utilize as little lubricant as possible in machining operations. A machine tool operating with this minimum amount of lubricant is said to be "near dry machining."

One approach to near dry machining is to provide a lubricant system which directs misted or atomized lubricant at the cutting head during operation. These systems present environmental dangers to machine shop operators, however, as the suspension of lubricant particles in the air can be deleterious to the operators' health. Moreover, systems of this nature, with their "shotgun" style approach to lubricant application, do not accurately target the cutting surfaces of the cutting head and may require continual manual adjustment as different cutting heads are exchanged during a machining operation. Further, these systems only offer limited configurability, ranging from manual on/off switches to, at best, valves to control the flow of lubricant onto the cutting head.

Accordingly, there is a need for a machine tool lubrication approach that more efficiently and accurately directs lubricant to the cutting surfaces of a cutting head, which is more highly configurable and less environmentally hazardous. The present invention satisfies these needs and provides other advantages as well.

SUMMARY OF THE INVENTION

In accordance with the present invention, a lubrication system for a machine tool delivers coherent packets of a lubricant to the cutting surface of the machine tool. The volume and frequency of the packets are controllable by a controller, which may be integrated with the CNC controls of a CNC machine tool. In addition, the position and orientation of the nozzle from which the packets are ejected may be adjusted by the controller, to accommodate machine tool cutting heads of various sizes and shapes.

According to one embodiment, the present invention is a lubrication system for delivering coherent packets of a lubricant to a cutting surface of a machine tool. The system includes a nozzle for delivering a coherent packet of lubricant to the cutting surface, a pump for providing the lubricant to the nozzle via a supply line, and a controller configured to control the pump to provide the nozzle with a desired volume of lubricant. The coherent packet of lubricant has a volume substantially equal to the desired volume provided by the pump.

According to another embodiment, the present invention is a lubrication system for automatically delivering coherent packets of a lubricant to a cutting surface of a machine tool. The system includes a moveable nozzle for delivering coherent packets of lubricant to the cutting surface, a pneumatic pump for providing the lubricant to the moveable nozzle, a hose connecting the pump and the moveable nozzle, a lubricant reservoir for storing the lubricant and supplying the lubricant to the pump, and a controller configured to control the pump to provide the moveable nozzle with a desired volume of lubricant at a desired frequency, and configured to position and orient the moveable nozzle. Each coherent packet of lubricant has a volume substantially equal to a volume displaced by one stroke of a piston of the pneumatic pump.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
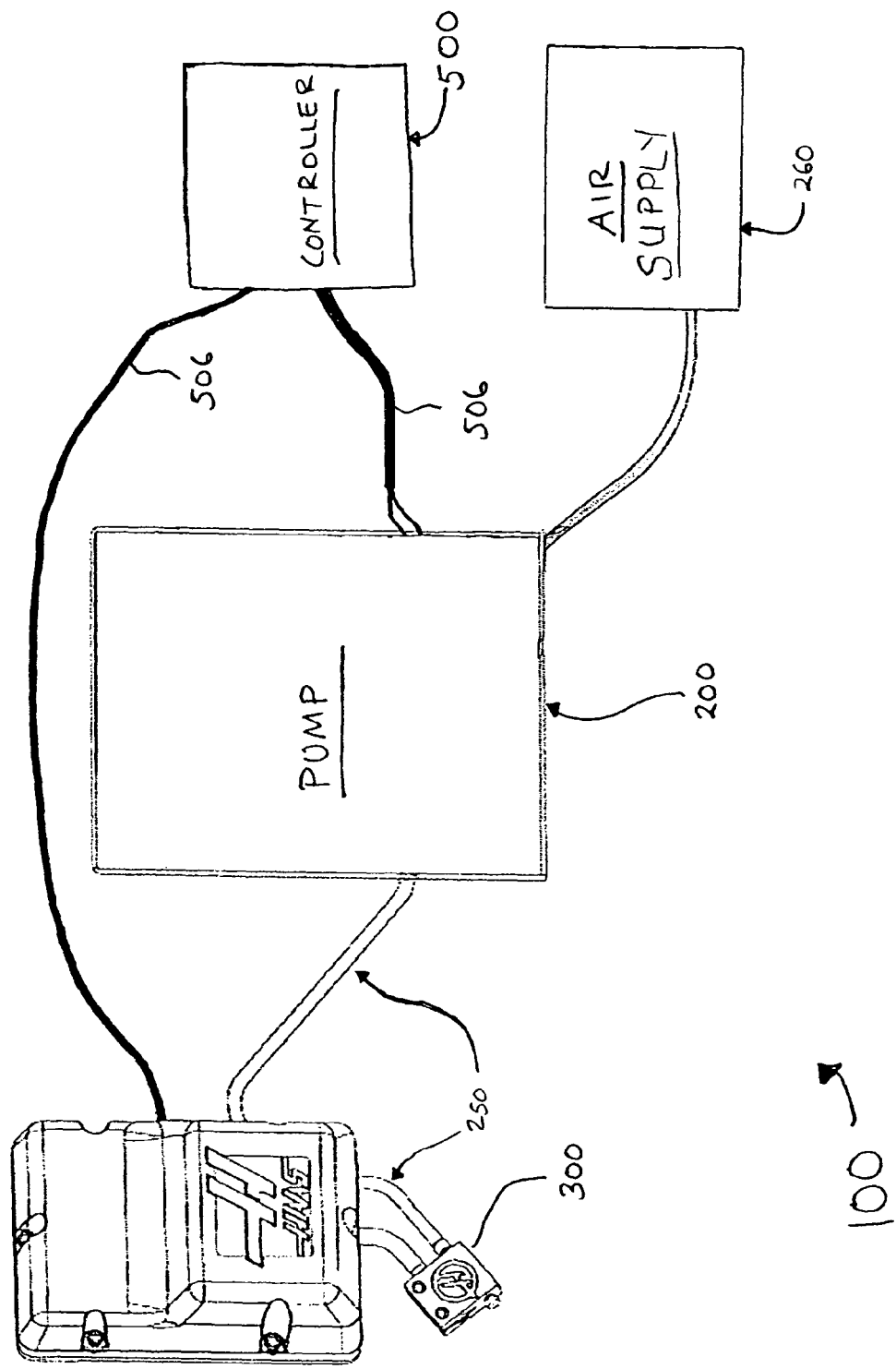
FIG. 1 depicts a lubrication system according to one embodiment of the present invention.

Referring to FIG. 1, a lubrication system 100 according to one embodiment of the present invention is illustrated. The lubrication system 100 includes a pneumatic pump 200 connected to a nozzle 300 by a supply line 250. The system also includes a controller 500 configured to control pump 200 and an air compressor 260 for supplying air pressure to the pump. Unlike conventional systems that atomize or mist a lubricant onto a cutting surface, the lubrication system of the present invention delivers coherent packets of lubricant to the cutting surface of a machine tool (not illustrated). Coherent packets, unlike atomized or misted sprays, consist of a single discrete body of lubricant directed in one direction. Controller 500 is connected to pump by signal line 506, and is configured to control pump 200 to provide nozzle 300 with a desired volume of lubricant at a desired frequency.

Figure 2:
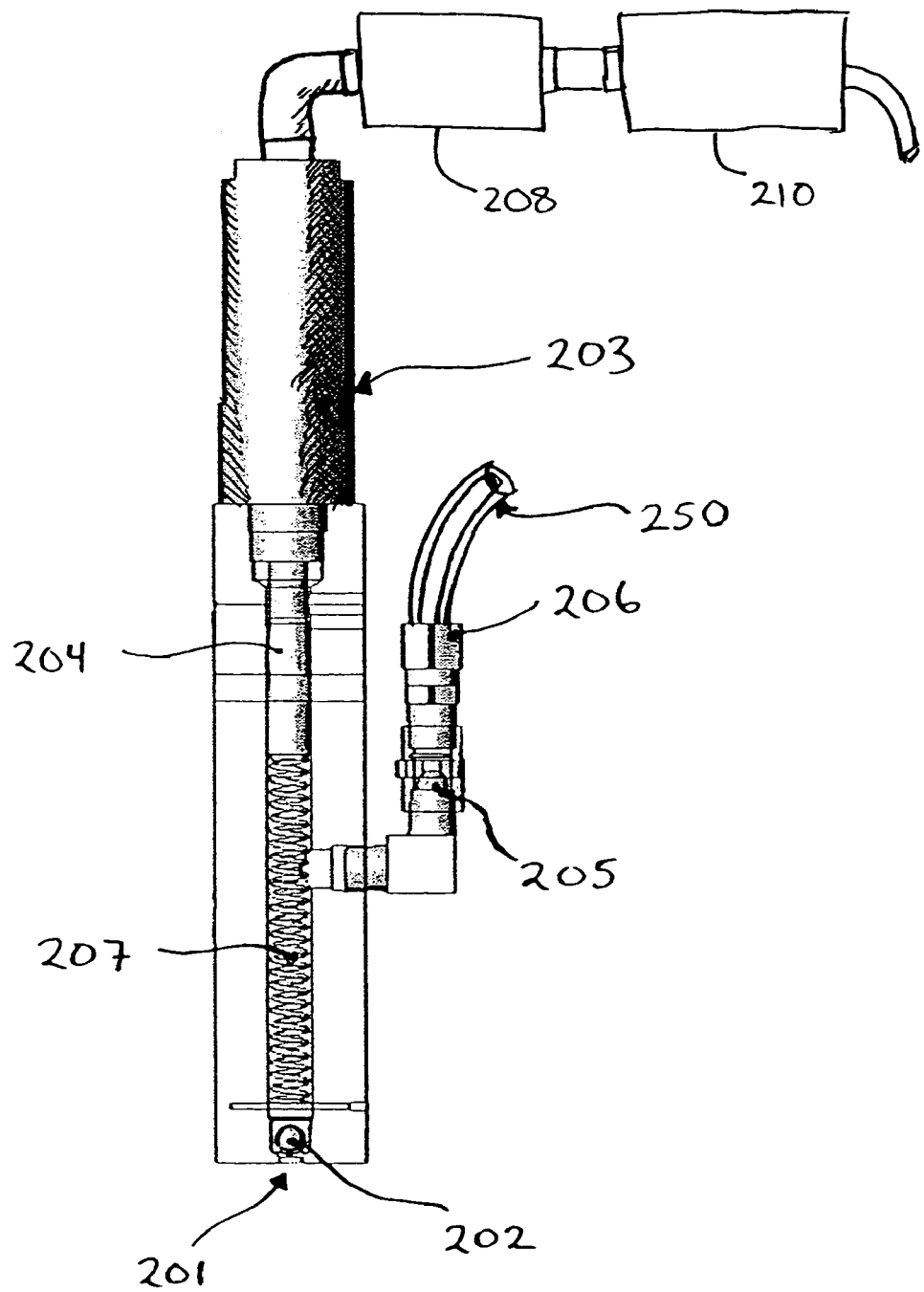
FIG. 2 provides a detailed view of the pump of a lubrication system according to one aspect of the present invention.

Turning to FIG. 2, pump 200 is illustrated in greater detail. Lubricant is supplied from a lubricant reservoir (not shown) to pump 200 through intake 201. Lubricant flows past the intake check valve 202, which prevents the lubricant from flowing back out of the pump 200 into the lubricant reservoir. When the solenoid 208 is actuated (e.g., by a signal received from controller 500), pressurized air from air pressure regulator 210 pressurizes air cylinder 203. Air cylinder 203 drives piston 204 down, closing the intake check valve 202 and opening the outlet check valve 205. As long as solenoid 208 is actuated, piston 204 will continue to be driven down against the pressure of return spring 207. The maximum displacement piston 204 is able to achieve against the restoring force of return spring 207 is determined by the air pressure supplied to air cylinder 203 by air pressure regulator 210. The duration of the actuation of solenoid 208 (i.e., the "on-time") and the pressure supplied by air pressure regulator 210 thereby determine the length of the stroke of piston 204. Because the length of the stroke of piston 204 is variable according to the air pressure and the duration of the "on-time," the volume of lubricant displaced by piston in each stroke is likewise variable. The action of piston 204 creates a "pressure pulse," which drives lubricant out of the pump through the outlet 206, into supply line 250, advancing the lubricant already in supply line 250 and through the nozzle (not shown).

A pneumatic pump in a lubrication system of the present invention need not have all of the components described above, may have additional components not described above, and may have components arranged in a different design than that described above. While the present exemplary embodiment has described pump 200 as a pneumatic pump, it will be apparent to one of skill in the art that the scope of the present invention is not limited to lubrication systems having pneumatic pumps. Rather, the scope of the present invention includes lubrication systems using other types of pumps suitable for pumping lubricant or other fluids, such as, for example, electric pumps, gas-powered pumps, and the like.

Figure 3:
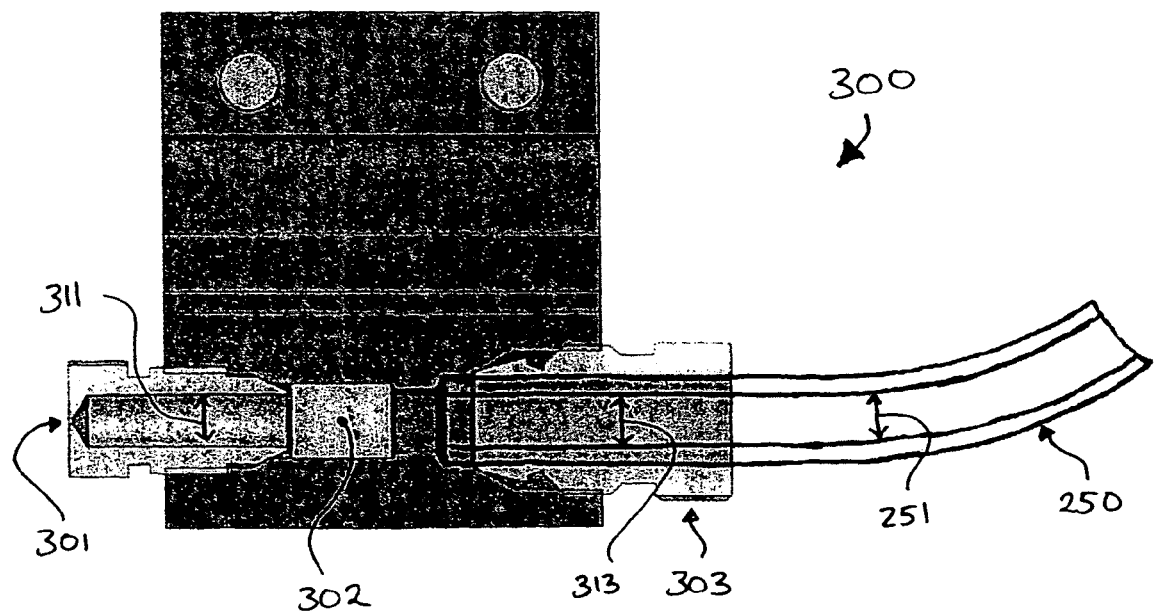
FIG. 3 provides a detailed view of the nozzle of a lubrication system according to one aspect of the present invention.

Turning to FIG. 3, nozzle 300 is illustrated in further detail. Nozzle 300 includes an opening 301 from which coherent packets of lubricant are ejected. Nozzle 300 further includes a check valve 302, for preventing lubricant from flowing backwards from the nozzle into the supply line 250. Nozzle 300 is connected to supply line 250 with fitting 303.

The diameter of the opening 301 of nozzle 300 is selected according to the viscosity and surface tension characteristics of the fluid to be provided by the lubrication system. According to one embodiment of the present invention, suitable for fluids with viscosities ranging from about 9 centi-Poise ("cP") to about 196 cP, the opening 301 of nozzle 300 has a diameter of about 0.02 inches. The scope of the present invention, however is not limited to nozzles with an opening this size. Rather, as will be apparent to one of skill in the art, the present invention may be utilized with nozzles having openings with different diameters for use with lubricants or other fluids having different viscosity ranges. According to one aspect of the present invention, the nozzle 300 is removable and interchangeable with other nozzles having openings of different diameters.

According to one aspect, in order to improve the flow of lubricant through the system, the internal diameter 311 of the nozzle 300, the internal diameter 313 of the fitting 303, and the internal diameter 251 of the supply line 250, are all selected to be about the same diameter. This matching of internal diameters helps to ensure that the path the lubricant follows from pump 200 through nozzle 300 (the "lubricant path") is substantially free of bubble trapping features.

Bubble trapping features are physical features in the lubricant path that act to prevent the lubricant path from being properly purged of air bubbles. For example, fittings that have or create internal cavities when assembled tend to capture air bubbles that negatively impact the system's performance. Other bubble trapping features include fissures in the supply line, turbulence-causing obstructions, and the like, all of which can trap air bubbles in places from which the flow of lubricant will be unable to dislodge them. Other undesirable bubble trapping features will be apparent to those of skill in the art.

According to one embodiment in which nozzle 300 is a moveable nozzle with components for being mounted in a machine tool, nozzle 300 may be positioned and oriented to direct packets of lubricant at a cutting surface. In many CNC machine tools, an automated cutting program includes exchanging one cutting head for another having different dimensions. Accordingly, to ensure that the coherent packet of lubricant is delivered to the cutting surfaces of different cutting head, nozzle 300 may be oriented and positioned corresponding to the requirements of each different cutting head utilized in a cutting program. When the cutting head is exchanged, nozzle 300 can be positioned and/or orientated so that the packets of lubricant are delivered to the cutting surface of the new cutting head. According to one embodiment, the nozzle 300 may be positioned and oriented using electric motors and/or servos. As will be apparent to one of skill in the art, however, the scope of the present invention is not limited to electric motors or servos, but rather includes any one of numerous methods or devices for positioning and adjusting nozzle 300.

FIG. 3 illustrates one exemplary embodiment of a nozzle of a lubrication system of the present invention. Other nozzle arrangements possessing the same characteristics of nozzle 300, having additional components, fewer components, or different arrangements, may also be used.

Figure 4A:
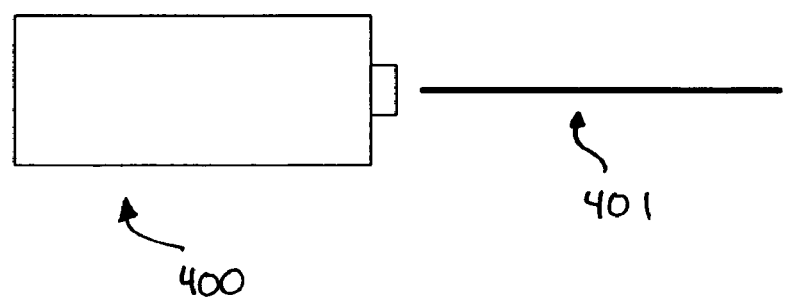
FIGS. 4A and 4B illustrate nozzles ejecting coherent packets of lubricant according to several aspects of the present invention.
Figure 4B:
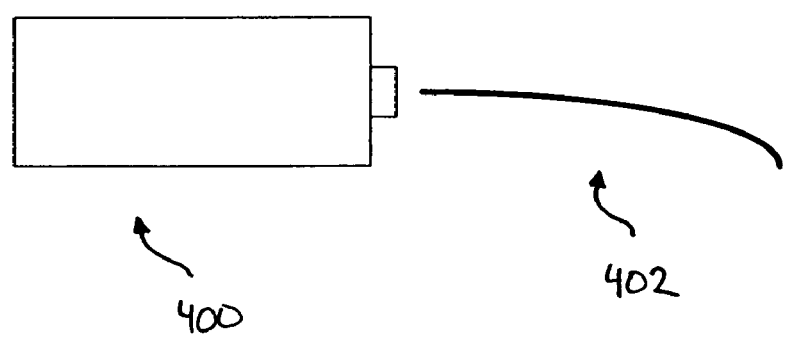

To ensure that a "crisp" packet of lubricant is ejected by nozzle 300, it is important both to keep the lubricant path substantially free of air bubbles and to choose a supply line that is resistant to expansion under pressure. FIGS. 4A and 4B illustrate a nozzle 400 ejecting both crisp and weak packets of lubricant. When an appropriately stiff supply line is used, and when the lubricant path has been properly purged, such that it is substantially free of bubbles, the coherent packet of lubricant 401 ejected from nozzle 400 will be desirably crisp (e.g., the entire packet 401 will be directed substantially at the cutting head). If the lubricant path has not been properly purged, or if the supply line is not sufficiently stiff, the packet of lubricant 402 will be undesirably weak (e.g., the front and rear portions of the packet 402 will be traveling more slowly than the middle portion, causing a dribble of lubricant between the cutting surface and the nozzle 400).

When the pump generates a pressure pulse (e.g., by actuating the solenoid to drive the piston), any residual air bubbles in the lubricant path will compress as the pressure in the lubricant path increases. The compression of bubbles will reduce the ability of the pump to generate the abrupt rise in pressure necessary to accelerate a coherent packet of oil through the nozzle opening and onto the cutting surface of the machine tool. Rather, because the bubbles act like springs absorbing the hydraulic energy, the pressure in the lubricant path will rise slowly, resulting in a weak packet. Similarly, the physical properties of the supply line are also important in achieving a crisp packet. If the material from which the supply line is constructed is not sufficiently stiff, expansion of the supply line under pressure may also act to absorb some of the hydraulic energy created by a pressure pulse, resulting in a weak packet.

According to one embodiment of the present invention, supply line 250 is a nylon hose. Nylon is used because it is sufficiently stiff to resist expansion, while at the same time is sufficiently bendable to permit the nozzle to be movable. According to one embodiment, supply line 250 is a nylon hose with a ¼" internal diameter. While the present exemplary embodiment has been described as utilizing a nylon hose, however, the scope of the present invention is not limited to nylon hoses, and encompasses any other supply line which is sufficiently stiff to resist unwanted supply line expansion, and sufficiently bendable to permit a moveable nozzle to be oriented and positioned. In yet another embodiment in which the nozzle is not moveable, rigid supply lines such as, for example, copper piping, PVC pipe, and the like, may be used.

To ensure that the lubricant path is free of bubbles, it is desirable to purge the system before use. According to one aspect, in the purge cycle, the pump operates continuously while being supplied with high air pressure to drive lubricant through the supply line 250 and out of the nozzle 300. In order for the purge cycle to rid the lubricant path of bubbles, not only must the system be designed to minimize bubble trapping features, but the pump and lubricant path must be designed such that the pump can generate sufficient fluid velocity to advance any bubbles collected in the lubricant path, for example, those that collect in high points of the lubricant path, out of the nozzle. Each stroke of the piston, during the purge cycle, must be able to advance any bubbles in the lubricant path further towards the nozzle than the bubbles are able to migrate backwards between one stroke and the next. If the cross-sectional area of the lubricant path is too large, the fluid velocity that the pump can achieve may be too low to advance bubbles out of high points in the lubricant path. Accordingly, the lubricant path must have a cross-sectional area sufficiently small in relation to the maximum flow rate of the pump to permit air bubbles to be purged from the lubricant path by operation of the pump. Those of skill in the art will be able to match appropriate supply line diameters with maximum pump flow rates.

According to one embodiment, the air pressure supplied to air cylinder 203 of pneumatic pump 200 by air regulator 210 during a purge cycle is elevated above the air pressure supplied during normal operation of the lubricant system. The air pressure may be adjusted automatically by the controller, or manually by the user. According to one aspect, light viscosity fluids that operate with an air pressure of about 5 psi to about 10 psi during normal operation will use an air pressure of about 30 psi during a purge cycle. Medium viscosity fluids that operate with an air pressure of about 10 psi to about 20 psi during normal operation will use an air pressure of about 40 psi during a purge cycle. High viscosity fluids that operate with an air pressure of about 20 psi to about 30 psi during normal operation will use an air pressure of about 50 psi during a purge cycle.

Figure 5:
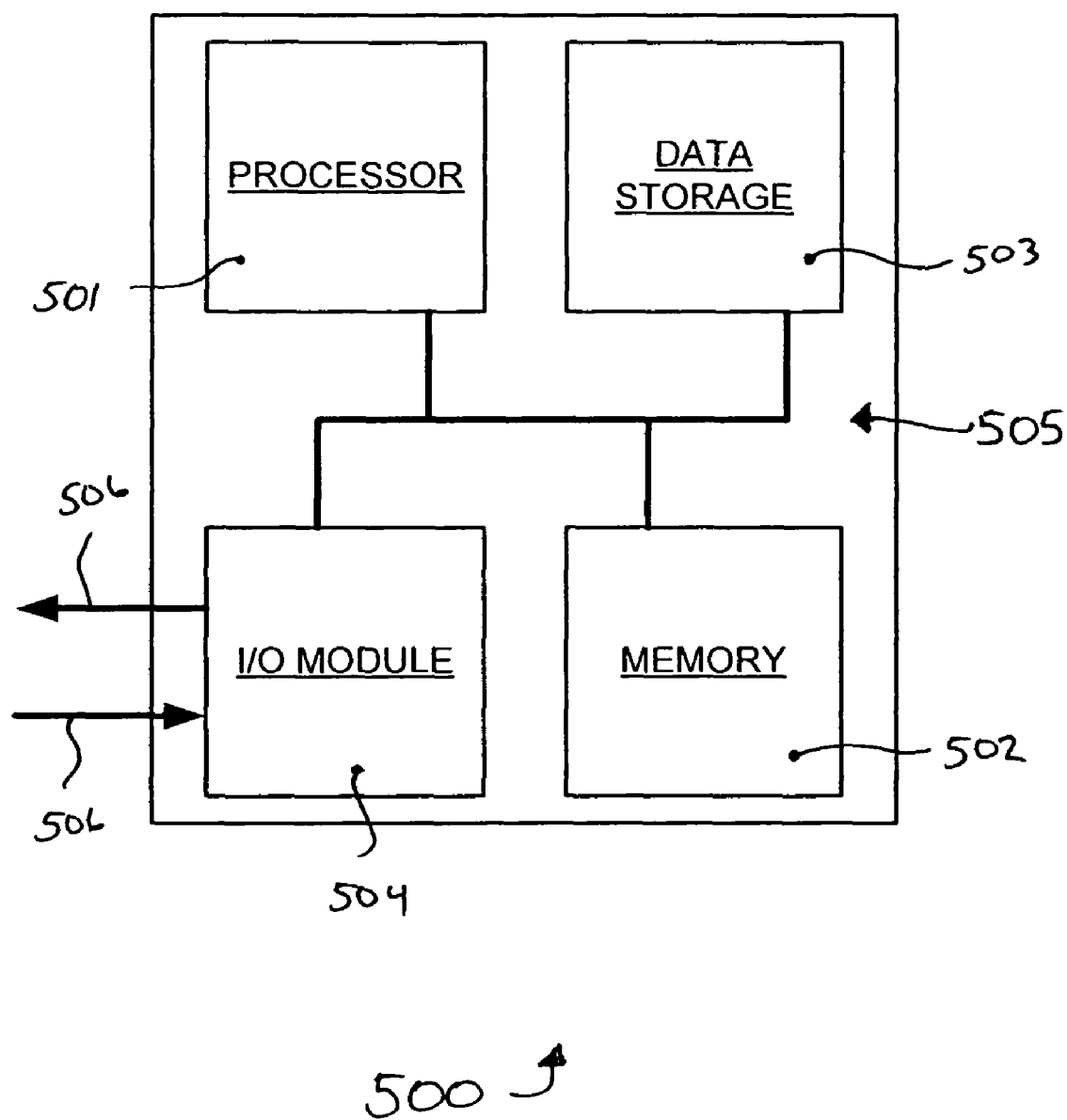
FIG. 5 provides a detailed view of the controller of a lubrication system according to one aspect of the present invention.

Turning to FIG. 5, controller 500 is illustrated in further detail. According to one embodiment of the present invention, controller 500 is a microcontroller having a processor 501, which is connected to memory 502 and data storage 503 by a bus 505. Data storage 503 may be any non-volatile data storage device capable of storage and retrieval of program code, such as, for example, flash memory, magnetic media, optical media, EEPROM, and the like. Memory 502 is random access memory for processor 501 to use as workspace for executing code. Controller 500 further includes I/O module 504 and signal lines 506, through which controller 500 communicates with the pump and the nozzle. I/O module 504 also permits communication between controller 500 and a user, using input and output devices such as, for example, keyboards, computer mice, computer monitors, printers, and the like. In alternative embodiments, controller 500 may comprise a microprocessor together with a finite state machine, or may similarly comprise a call processor.

A set of instructions for operating the lubrication system (i.e., a "lubrication program") is stored in data storage 503. The lubrication program may be loaded into data storage 503 using, for example, a disk drive (not shown) or a network connection (not shown). Alternately, the lubrication program may be loaded into data storage 503 at the time of manufacture. Processor 501 loads lubrication program from data storage 503 into memory 502, and executes the code of the lubrication program for performing the operations of the present invention.

While only a single controller is depicted in FIG. 5, it is to be understood that more than one controller can be incorporated into the lubrication system of the present invention, with various control tasks being distributed between the controllers. While the present exemplary embodiment has described a controller for use with executable program code stored in data storage and loaded into memory, the scope of the present invention is not limited by a controller that is thus configured. In alternate embodiments, the controller may be configured to accept user input and provide user output during the operation of the lubrication system, for adjusting nozzle position and orientation, lubrication amount and frequency, for initiating and ending purge cycles, or for any other purpose. The operation of controller 500 will be described further below.

Referring again to FIG. 1, controller 500 is used to control pump 200. Controller 500 controls pump 200 by switching current to a solenoid 208 of pump 200 and by varying the air pressure supplied to an air cylinder 203 of the pump by an air pressure regulator 210. When the solenoid is actuated by the current, air pressure pressurizes an air cylinder in pump 200, which drives a piston down against a return spring for as long as the solenoid remains actuated. As described more fully above, the stroke length of the piston 204 of pump 200 is determined by the air pressure supplied by the air pressure regulator and the duration for which the piston is driven by the air pressure. Therefore, controller 500 can control the volume of lubricant displaced by the piston and advanced along the lubricant path. When the system is substantially free of bubbles, this volume will be substantially equal to the volume of one packet ejected by nozzle 300. In this manner, controller 500 can control the volume of each packet of lubricant. By varying the frequency with which the solenoid is actuated, controller 500 can vary the frequency with which packets of lubricant will be ejected by nozzle 300.

Controller 500 may also be configured to position and orient nozzle 300 to direct packets of lubricant at a cutting surface. A lubrication program may include different positions and orientations for nozzle 300 corresponding to the requirements of each different cutting head utilized in a cutting program.

In one embodiment, controller 500 is programmed with a lubrication program (e.g., executable code) for automatically providing coherent packets of lubricants with desired volumes at desired frequencies. The lubrication program may further include positioning and orienting nozzle 300. According to another aspect, controller 500 is user-configurable during operation of the machine tool, so that an operator of the machine tool may adjust the lubrication system "on-the-fly."

While the controller has been described as controlling the lubrication system of the present invention, it will be apparent to one of skill in the art that the controller may be an integrated controller for controlling additional aspects of the machine tool. In this way, one controller can be used to control both the cutting program of the machine tool and the lubrication program of the lubrication system.

Figure 6:
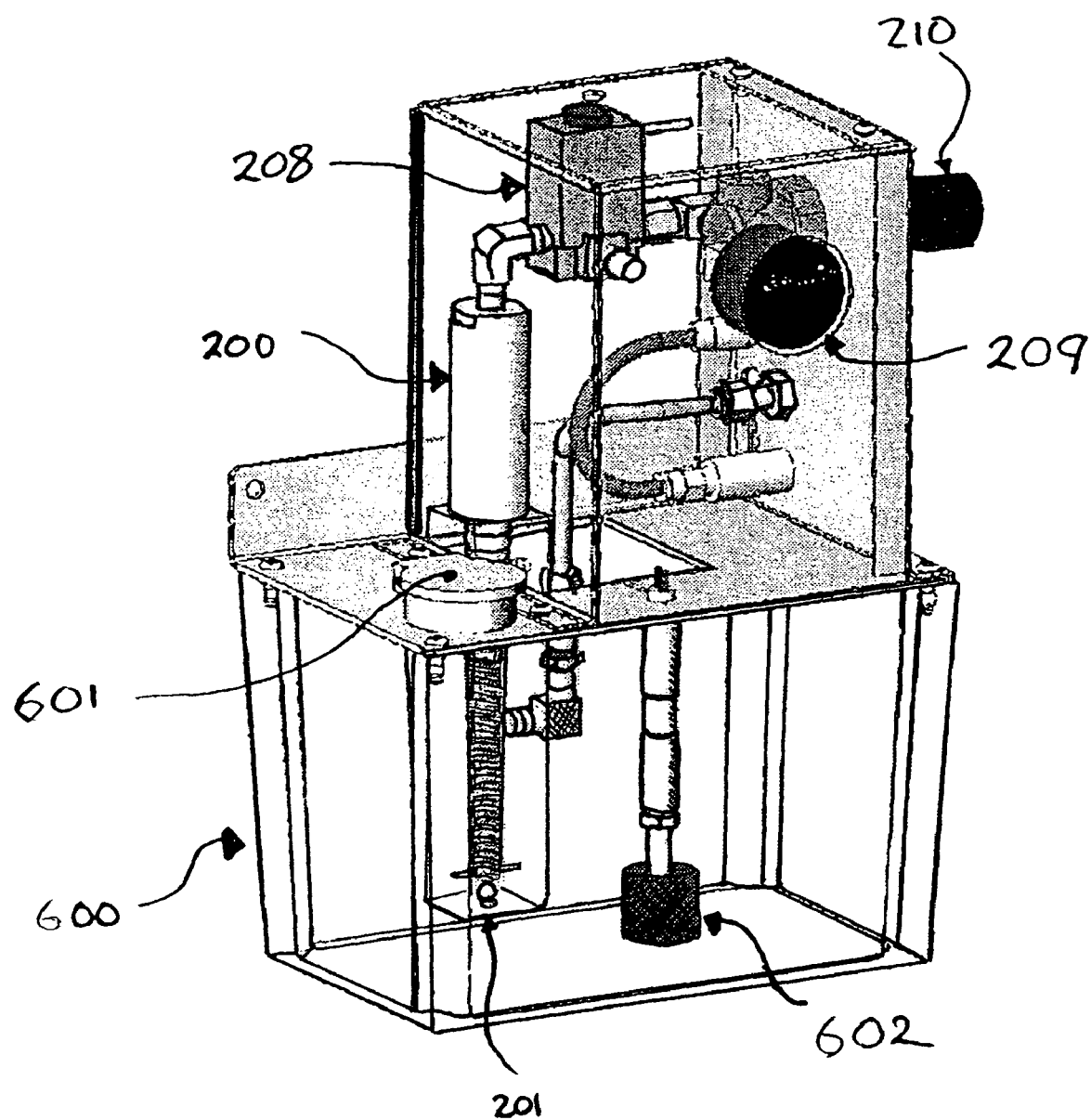
FIG. 6 illustrates a partial views of a lubrication system according to one embodiment of the present invention.

FIG. 6 illustrates a lubricant reservoir 600 according to one aspect of the present invention. Lubricant reservoir 600 is for storing lubricant and providing it to pump 200. Lubricant reservoir 600 has a capacity large enough to provide an uninterrupted supply of lubricant to pump 200 for the duration of a lubrication program. The intake 201 of pump 200 is submerged in lubricant reservoir 600. Lubricant reservoir 600 includes a fill cap 601 and a level sensor 602, which detects when the level of lubricant remaining in lubricant reservoir 600 is about to fall below the level of intake 201. According to the present exemplary embodiment, pump 200 includes air pressure gauge 209, which indicates the air pressure supplied by air pressure regulator 210.

While the pump of the present exemplary embodiment has been illustrated and described as being submerged in the lubricant reservoir, it will be apparent to one of skill in the art that the pump need not be submerged in the lubricant reservoir. In alternate embodiments, the lubricant reservoir may be located separate from the pump and connected by a lubricant supply line for supplying lubricant to the pump.

While the present exemplary embodiment has been described as providing a minimal amount of lubricant for near-dry machining operations, the scope of the present invention is not limited to near-dry machining. Rather, as will be apparent to one of skill in the art, a lubrication system of the present invention may provide any desired amount of lubricant to the cutting surface of a cutting head of a machine tool.

While the present exemplary embodiment is described as delivering coherent packets of lubricant, the scope of the present invention is not limited to the use of lubricant. Rather, a lubrication system of the present invention may deliver any one of a number of fluids suitable for delivery to cutting surfaces of a cutting head of a machine tool, such as, for example, cutting oils, coolant concentrate, tapping fluids, and the like. In one embodiment, in which a vegetable based oil is provided, the lubrication system of the present invention is an environmentally friendly alternative to a conventional lubrication system utilizing standard machine coolant.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A lubrication system for delivering discrete packets of a lubricant to a cutting surface of a machine tool, the system comprising:
a nozzle configured to deliver a single discrete packet of lubricant to the cutting surface;
a supply line coupled to the nozzle via a fitting, the fitting comprising an inlet for receiving the lubricant from an outlet of the supply line, the nozzle comprising an inlet for receiving the lubricant from an outlet of the fitting, wherein a diameter of the inlet of the nozzle, a diameter of the outlet of the supply line, a diameter of the inlet of the fitting, and a diameter of the outlet of the fitting are selected to be the same diameter;
a pump coupled to the supply line and configured to provide the lubricant to the nozzle via the supply line; and
a controller configured to control the pump to provide the nozzle with a desired volume of lubricant, wherein the single discrete packet of lubricant has a volume substantially equal to the desired volume of lubricant provided by the pump.

2. The lubrication system of claim 1, further comprising a lubricant reservoir for storing the lubricant and supplying the lubricant to the pump.

3. The lubrication system of claim 2, wherein the pump includes an intake check valve for preventing the lubricant from flowing from the pump to the lubricant reservoir and an outlet check valve for preventing the lubricant from flowing from the supply line to the pump.

4. The lubrication system of claim 1, wherein the nozzle includes a check valve for preventing the lubricant from flowing from the nozzle to the supply line.

5. The lubrication system of claim 1, wherein the nozzle is movable, and wherein the controller is configured to position and orient the movable nozzle.

6. The lubrication system of claim 5, wherein the supply line is bendable to allow for adjusting the nozzle's position and orientation.

7. The lubrication system of claim 1, wherein the pump is a pneumatic pump.

8. The lubrication system of claim 7, wherein the controller is configured to control the pump by adjusting air pressure supplied to the pump and by actuating a solenoid of the pump to drive a piston of the pump with the air pressure.

9. The lubrication system of claim 8, wherein the single discrete packet of the lubricant has a volume substantially equal to a volume displaced by one stroke of the piston of the pump.

10. The lubrication system of claim 1, wherein the controller is configured to operate automatically according to a lubrication program.

11. The lubrication system of claim 1, wherein the controller is user-configurable during operation of the machine tool.

12. The lubrication system of claim 1, wherein the controller is configured to purge air from the pump, the supply line and the nozzle.

13. The lubrication system of claim 1, wherein the controller is an integrated controller configured to control both the operation of the lubrication system and the operation of the machine tool.

14. The lubrication system of claim 1, wherein the lubricant follows a lubricant path from the pump to the nozzle, the lubricant path having a cross-sectional area sufficiently small to permit air bubbles to be purged from the lubricant path by operation of the pump.

15. The lubrication system of claim 14, wherein the lubricant path is substantially free of bubble trapping features.

16. The lubrication system of claim 1, wherein the supply line resists expansion under pressure created by the pump.

17. The lubrication system of claim 1, wherein the supply line is a nylon hose.

18. A lubrication system for automatically delivering discrete packets of a lubricant to a cutting surface of a machine tool, the system comprising:
a moveable nozzle configured to deliver discrete packets of lubricant to the cutting surface;
a hose coupled to the moveable nozzle via a fitting, the fitting comprising an inlet for receiving the lubricant from an outlet of the hose, the nozzle comprising an inlet for receiving the lubricant from an outlet of the fitting, wherein a diameter of the inlet of the nozzle, a diameter of the outlet of the hose, a diameter of the inlet of the fitting, and a diameter of the outlet of the fitting are selected to be the same diameter;

a pneumatic pump coupled to the hose and configured to provide the lubricant to the moveable nozzle via the hose;

a lubricant reservoir for storing the lubricant and supplying the lubricant to the pump; and a controller configured to control the pump to provide the moveable nozzle with a desired volume of lubricant at a desired frequency, and configured to position and orient the moveable nozzle, wherein each discrete packet of lubricant has a volume substantially equal to the desired volume of lubricant, and wherein the desired volume of lubricant is displaced by one stroke of a piston of the pneumatic pump.

19. The lubrication system of claim 18, wherein the pump includes an intake check valve for preventing the lubricant from flowing from the pump to the lubricant reservoir and an outlet check valve for preventing the lubricant from flowing from the hose to the pump.

20. The lubrication system of claim 18, wherein the moveable nozzle includes a check valve for preventing the lubricant from flowing from the moveable nozzle to the hose.

21. The lubrication system of claim 18, wherein the lubricant follows a lubricant path from the pump to the moveable nozzle, the lubricant path having a cross-sectional area sufficiently small to permit air bubbles to be purged from the lubricant path by operation of the pump.

22. The lubrication system of claim 18, wherein the controller is an integrated controller configured to control both the operation of the lubrication system and the operation of the machine tool.

23. The lubrication system of claim 21, wherein the lubricant path is substantially free of bubble trapping features.

24. The lubrication system of claim 15, wherein the bubble trapping features comprise at least one of cavities, fissures, and turbulence-causing obstructions.

25. The lubrication system of claim 1, wherein the inlet of the fitting is coaxial with the outlet of the supply line, and wherein the outlet of the fitting is coaxial with the inlet of the nozzle.

* * * * *